US005889823A

United States Patent [19]
Agazzi et al.

[11] Patent Number: 5,889,823
[45] Date of Patent: Mar. 30, 1999

[54] METHOD AND APPARATUS FOR COMPENSATION OF LINEAR OR NONLINEAR INTERSYMBOL INTERFERENCE AND NOISE CORRELATION IN MAGNETIC RECORDING CHANNELS

[75] Inventors: Oscar E. Agazzi, Florham Park; Nambirajan Seshadri, Chatham, both of N.J.

[73] Assignee: Lucent Technologies Inc., Murray Hill, N.J.

[21] Appl. No.: 572,276

[22] Filed: Dec. 13, 1995

[51] Int. Cl.$^6$ .............................. H03D 1/00; H04L 23/02; G06F 11/10
[52] U.S. Cl. ....................... 375/341; 375/340; 375/261; 375/264; 371/43.2; 371/43.4; 371/43.7
[58] Field of Search ..................................... 375/341, 340, 375/290, 261, 264, 298, 354; 371/43, 43.2, 43.4, 43.7, 43.8, 46

[56] References Cited

U.S. PATENT DOCUMENTS

| | | | |
|---|---|---|---|
| 5,228,061 | 7/1993 | Newby et al. | 375/341 |
| 5,329,586 | 7/1994 | Agazzi | 379/406 |
| 5,457,704 | 10/1995 | Hoeher et al. | 371/43 |
| 5,488,637 | 1/1996 | Jeong et al. | 375/341 |
| 5,521,945 | 5/1996 | Knudson | 375/341 |
| 5,537,444 | 7/1996 | Nill et al. | 375/341 |
| 5,619,539 | 4/1997 | Coker et al. | 375/341 |

OTHER PUBLICATIONS

U.S. application No. 08/381,630, Agazzi, filed Jan. 31, 1994.
H. Kobayashi and D.T. Tang, "Application of Partial–response Channel Coding to Magnetic Recording Systems," IBM J. Res. Develop. Jul. 1970 pp. 368–375.
Nils Holte and Steiner Stueflotten, "A New Digital Echo Canceler for Two–Wire Subscriber Lines," IEEE Transactions On Communications, vol. Com–29, No. 11, Nov. 1981 pp. 1573–1581.
G. David Forney, Jr., "The Viterbi Alorithm," Proceedings of the IEEE, vol. 61, No. 3, Mar. 1973 pp. 268–278.
G. David Forney, Jr., "Maximum–Likelihood Sequence Estimation of Digital Sequences in the Presence of Intersymbol Interference," IEEE Transactions On Information Theory, vol. IT–18, No. 3, May 1972 pp. 363–378.
Thomas M. Cover and Joy A. Thomas, Elements of Information Theory, pp. 274–276, (1991).
William H. Press, et al., Numerical Recipes in C: The Art of Scientific Computing, pp. 564–575 (1994).
Oscar E. Agazzi and Nambi Seshadri, "When Can Tentative Decisions be Used to Cancel (Linear or Nonlinear) Intersymbol Interference? (With Application to Magnetic Recording Channels)," Feb. 1995 IEEE pp. 647–652.

(List continued on next page.)

Primary Examiner—Chi H. Pham
Assistant Examiner—Khai Tran

[57] ABSTRACT

A method and apparatus for decoding a signal in the presence of linear or nonlinear interference, correlated noise or a combination thereof. The method involves a concatenated decoder comprising an inner decoder and a postprocessor. N most likely paths are generated by the inner decoder, or a combination of the inner decoder and an error event generator. These paths are then presented to the postprocessor which computes metrics for each path based on information about the signal, not considered by the inner decoder. These metrics can be based on linear or nonlinear model of the channel and optionally, a noise whitened signal for noise decorrelation. The path with the best metric is selected as the concatenated decoder output. The postprocessor can also be implemented in the presence of channel codes. It is also shown that the postprocessor is especially suited for a trellis implementation. When applied to magnetic recording channels, the method of the present invention allows for increased recording capacity. In addition, the present invention requires less computation and results in a reduction of the power dissipation of about two orders of magnitude compared to alternative approaches.

26 Claims, 9 Drawing Sheets

OTHER PUBLICATIONS

Andrew J. Viterbi "Error Bounds for Convolutional Codes and an Asymptotically Optimum Decoding Algorithm," IEEE Transactions on Information Theory, vol. It–13, No. 2, Apr. 1967 pp. 260–269.

Jeff Sonntag, et al. "A High Speed, Low Power PRML Read Channel Device," IEEE Transactions on Magnetic, vol. 31, No. 2, Mar. 1995 pp. 1186–1194.

H.K. Thapar and A.M. Patel, "A Class of Partial Response Systems for Increasing Storage Density in Magnetic Recording," IEEE Transaction on Magnetics, vol. Mag–23, No. 5, Sep. 1987, pp. 3666–3668.

Peter Kabal and Subbarayan Pasupathy, "Parital–Response Signaling," IEEE Transactions on Communications, vol. Com–23, No. 9, Sep. 1975, pp. 921–934.

E.R. Dretzmer, "Generalization of a Technique for Binary Data Communications," IEEE Transactions on Communication Technology, Feb. 1966, pp. 67–68.

Adam Lender, "Correlative Level Coding For Binary–data Transmission," IEEE Spectum, Feb. 1966 pp., 104–115.

Kelly J. Knudson, et al. "A Concatenated Decoding Scheme for (1–D) Partial Response with Matched Spectral–Null Coding".

N. Seshadri and C–E. W. Sundberg, "Generalized Viterbi Algorithms for Error Detection with Convolutional Codes," 1989 IEEE, 43.3.1–43.3.5.

Roy D. Cideciyan, et al., "A PRML System for Digital Magnetic Recording," IEEE Journal On Selected Areas In Communication, vol. 10, No. 1, Jan. 1992, pp. 38–56.

R. Hermann, "Volterra Modeling of Digital Magnetic Saturation Recording Channels," IEEE Transactions on Magnetic, vol. 26, No. 5, Sep. 1990, pp. 2125–2127.

Oscar Agazzi, et al., "Nonlinear Echo Cancellation of Data Signals," IEEE Transactions on Communications, vol. Com–30, No. 11, Nov. 1982,pp. 2421–2433.

Oscar Agazzi, et al., "Timing Recovery in Digital Subscriber Loops," IEEE Transactions on Communications, vol. Com–33, No. 6, Jun. 1985, pp. 558–568.

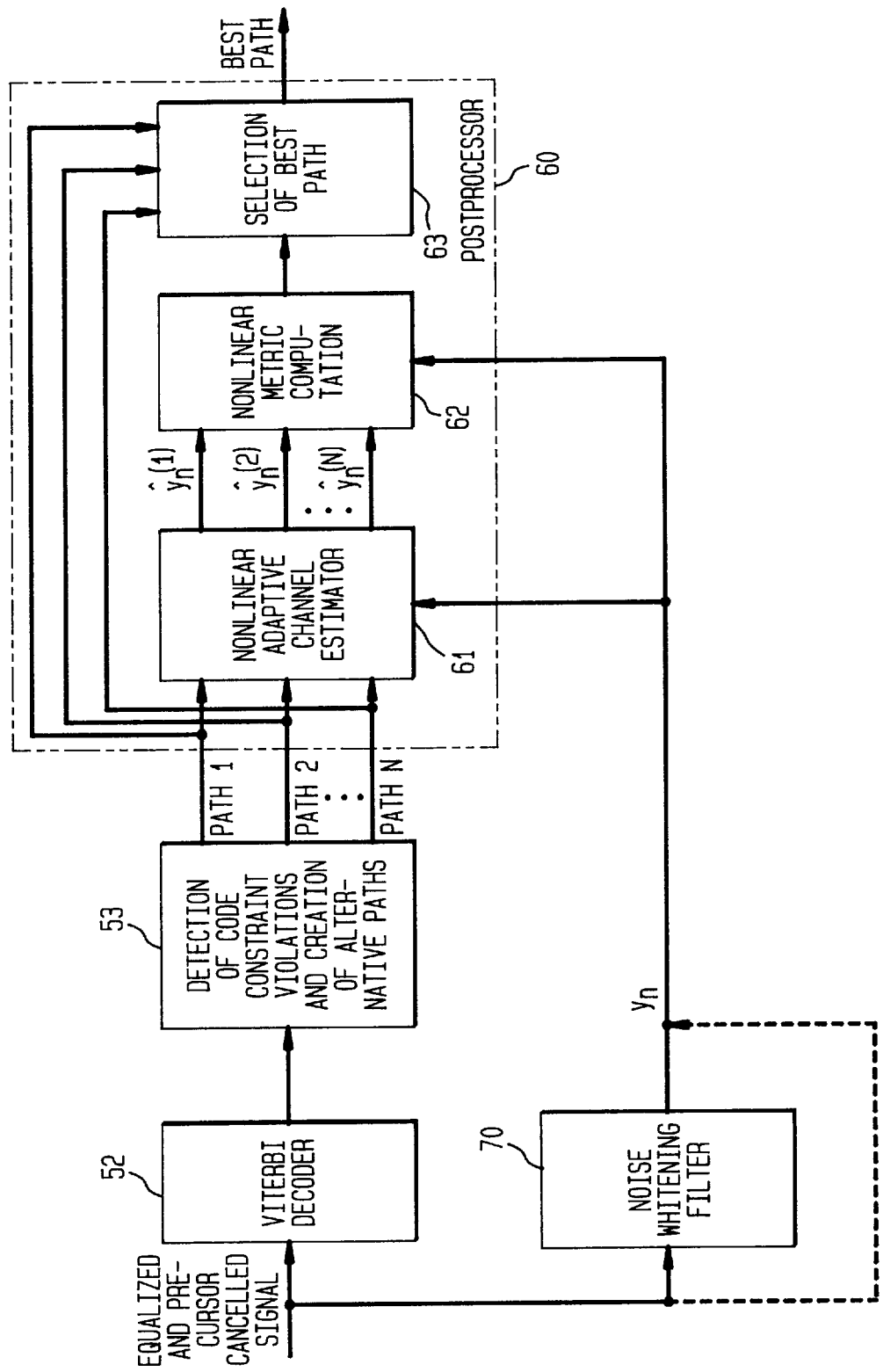

METHOD AND APPARATUS FOR COMPENSATION OF LINEAR OR NONLINEAR INTERSYMBOL INTERFERENCE AND NOISE CORRELATION IN MAGNETIC RECORDING CHANNELS

FIELD OF THE INVENTION

The present invention relates generally to a method and apparatus for decoding a signal in the presence of linear or nonlinear interference, correlated noise or a combination thereof. When applied to magnetic recording channels, the invention allows for increased recording capacity.

BACKGROUND OF THE INVENTION

Magnetic recording systems are commonly used for secondary storage in computer systems. As a result of the widespread use of, and growing applications for computers, there is a continuous demand for increased storage capacity. Therefore, methods and apparatus for increasing recording densities, the amount of information stored in a given volume, are continuously explored.

As recording density increases, the electronic pulses induced on the read heads by adjacent bits increasingly tend to interfere and partially cancel each other, resulting in a decrease of the intensity of the detected signal. In addition, the noise increases as a result of various effects, such as the interference from nearby tracks. The net result is that the signal to noise ratio ("SNR") tends to decrease rapidly with increased recording density. Accordingly, with increased densities, there is also a need for more advanced signal processing techniques.

One of the signal processing techniques that has resulted in significant increases in density is known as "Partial Response Maximum Likelihood" (PRML). This technique was introduced in H. Kobayashi and D. T. Tang, *Application of Partial-Response Channel Coding to Magnetic Recording Systems*, 14 IBM Journal of Research and Development pp. 368–375 (July 1970), hereby incorporated by reference as if fully set forth herein, but not applied to disk drive systems until very recently. In this technique, the discrete-time channel response is shaped by means of an adaptive filter called an Equalizer, in such a way that its transfer function, expressed as a D-transform, is $$H(D)=1-D^2 \qquad (1)$$

This response is usually known as "Partial Response Class IV" (PR IV), and was first described in A. Lender, *Correlative Level Coding for Binary Data Transmission*, 3 IEEE Spectrum pp. 106–115 (February 1966), and E. R. Kretzmer, *Generalization of a Technique for Binary Data Communication*, COM-14 IEEE Transactions on Communications pp. 67–68 (February 1966), and further developed by P. Kabal and S. Pasupathy, *Partial-Response Signalling*, COM-23 IEEE Transactions on Communications (September 1975), all three of which are hereby incorporated by reference as if fully set forth herein.

PRML is the result of combining PR IV with another technique called "Maximum Likelihood Detection", introduced in A. J. Viterbi, *Error Bounds for Convolutional Codes and an Asymptotically Optimum Decoding Algorithm*, IT-13 IEEE Transactions on Information Theory pp. 260–269 (April 1967), and further developed in G. D. Forney, *Maximum-Likelihood Sequence Estimation of Digital Sequences in the Presence of Intersymbol Interference*, IT-18 IEEE Transactions on Information Theory (May 1972), and G. D. Forney, *The Viterbi Algorithm*, 61 Proceedings of the IEEE pp. 268–278 (March 1973), all three of which are hereby incorporated by reference, as if fully set forth herein. Other types of partial responses of interest in magnetic recording channels are described in H. K. Thapar and A. M. Patel, *A Class of Partial Response Systems for Increasing Storage Density in Magnetic Recording*, MAG-23 IEEE Transaction on Magnetics pp. 3666–3668 (September 1987), hereby incorporated by reference as if fully set forth herein. These responses are of the general type $$H(D)=(1-D)(1+D)^n \qquad (2)$$

The case of PR IV mentioned above is a special case of this equation, for which n=1. Another case of interest in the context of the present invention is the case of n=2, a response known as "Extended Partial Response Class IV", or EPR IV.

A maximum likelihood sequence detection ("MLSD") scheme determines the sequence of data symbols that best matches an observed sequence of signal samples that have been corrupted by noise and interference. A common implementation of an MLSD scheme involves the Viterbi algorithm. The Viterbi algorithm performs maximum likelihood sequence detection of finite state signals in noise.

In many situations, the state space is too large to search directly. One example of such a situation is when the channel response extends over a long time. In general, if the number of nonzero samples of the channel impulse response is L, the number of states required for an optimal Viterbi decoder for binary data is $2^{(L-1)}$. Thus the complexity of the optimal decoder grows exponentially with the length of the channel impulse response. In these situations, suboptimal detection techniques may provide a reasonable tradeoff between performance and complexity.

Concatenated decoding schemes are an example of suboptimal detection schemes whose performance often approaches the performance of the optimal decoder and whose complexity is substantially lower. One exemplary concatenated decoding scheme is found in N. Seshadri and C. E. W. Sunberg, *Generalized Viterbi Algorithms for Error Detection with Convolutional Codes*, Proceedings of Globecom 89, pp. 1534–1538, hereby incorporated by reference as if fully set forth herein. This scheme as well as others of its kind, include a modified Viterbi algorithm in which an ordered list of an arbitrary number ("N") of best paths and their corresponding likelihoods, each corresponding to a sequence of data which may reflect the transmitted sequence of data, are produced while an error detection code chooses the first error-free path from the list.

An alternative to an N-best Viterbi algorithm is to generate a list of candidate data sequences by adding minimum-distance error events to the single best path released by the Viterbi decoder. This scheme was used in decoding DC-free block codes in partial response channels in K. Knudson, et al., *A Concatenated Decoding Scheme for* (1–D) *Partial Response with Matched Spectral Null Coding*, Proceedings of GLOBECOM 93, hereby incorporated by reference as if fully set forth herein. The inner decoder ignores the code constraints, while a postprocessor eliminates the sequences that violate the constraints.

As mentioned, increased storage density tends to increase the amount of interference between adjacent bits and tracks. The interference among adjacent bits is referred to as intersymbol interference ("ISI"), and the interference between adjacent tracks is called intertrack interference ("ITI"). Specifically, ISI occurs because the detected pulses are not properly confined to their time slot, i.e., baud period, available to the reading of a single data symbol. As a result, the neighboring pulses interfere with each other and degrade the margin against random noise available to the detector.

Owing to the importance of storage capacity of magnetic recording systems, various methods have been proposed for compensating ISI. The most common of such methods is equalization, which is well known to those skilled in the art. Another method using tentative decisions is described in O. E. Agazzi and N. Seshadri, Cancellation of Precursor Intersymbol Interference in Magnetic Recording Channels, U.S. patent application Ser. No. 08/381,630, filed on Jan. 31, 1995, hereby incorporated by reference as if fully set forth herein.

Intersymbol interference is, however, only one of the many impairments that limit the storage density. Other impairments include intertrack interference, as mentioned above, and nonlinear distortion. Nonlinearity arises in the magnetic recording channel as a result of factors such as the hysteresis of the magnetic material. It may also arise as a result of the nonlinear transfer characteristic of certain heads, known as magnetoresistive heads.

Nonlinear distortion can be considered a generalized intersymbol interference. A more complete description of nonlinear distortion in data transmission systems is discussed in O. E. Agazzi et al., *Nonlinear Echo Cancellation of Data Signals,* COM-30 IEEE Transactions on Communications pp. 2421–2433 (November 1982) and in O. E. Agazzi et al., *Timing Recovery in Digital Subscriber Loops,* COM-33 IEEE Transactions on Communications pp. 558–569 (June 1985), both of which are hereby incorporated by reference as if fully set forth herein. Another description is given in R. Hermann, *Volterra Modeling of Digital Magnetic Saturation Recording Channels* 26 IEEE Transactions on Magnetics pp. 2125–2127, App. A (September 1990), hereby incorporated by reference as if fully set forth herein. These descriptions can also be applied to nonlinear distortion in magnetic recording channels.

Write precompensation techniques are known in the prior art and are useful for compensating part of the nonlinearity in magnetic recording channels. However, write precompensation is not perfect, and substantial nonlinearity remains in the precompensated signals. This motivates the use of other techniques to alleviate the detrimental effects of nonlinearity.

One possible technique would be cancellation as, for example, based on tentative decisions, as is used for linear intersymbol interference and described in the above referenced U.S. Patent Application. However, it has been shown that cancellation is not effective for the case of nonlinearity. The reasons for this lack of effectiveness are explained in O. E. Agazzi and N. Seshadri, *When Can Tentative Decisions be Used to Cancel (Linear or Nonlinear) Intersymbol Interference?* (With Application to Magnetic Recording Channels), Proceedings of the 1995 International Conference on Communications pp. 647–652 (Seattle, Washington, June 1995), hereby incorporated by reference as if fully set forth herein.

Another possible technique to mitigate the effects of nonlinearity in magnetic recording channels is to implement the Viterbi algorithm to perform a maximum likelihood sequence detection based on a model of the channel that incorporates a complete description of the nonlinearity. In this technique, the branch metric associated with the transition between two arbitrary states $S_{n-1}$ and $S_n$ is given by $(y_n - F(a_n, a_{n-1}, \ldots, a_{n-M+1}))^2$ where $y_n$ is the most recent sample of the received signal, $a_n, a_{n-1}, \ldots, a_{n-M+1}$ are the M bits associated with the transition between states $S_{n-1}$ and $S_n$, and $F()$ is a nonlinear function that models the channel. This nonlinear function is usually not known a priori, but it can be estimated using nonlinear adaptive filtering techniques well known in the prior art. See, e.g. O. E. Agazzi et al., *Nonlinear Echo Cancellation of Data Signals,* supra and N. Holte and S. Stueflotten, *A New Digital Echo Canceler for Two-Wire Subscriber Lines,* COM-29 IEEE Transactions on Communications (November 1981), hereby incorporated by reference as if full set forth herein.

Although in principle this method provides the optimal performance, a major problem is its complexity. As was mentioned before, the complexity of the Viterbi decoder grows exponentially with the length of the channel response. This applies both to the linear and the nonlinear case.

A related problem is that often a significant portion of the nonlinear components of the channel response appear as "precursors," components that precede in time, the appearance of the main component of the channel response. These precursors can, in principle, be taken into account by a nonlinear channel estimator in the Viterbi decoder. However each additional precursor that is accounted for results in doubling the number of states.

Another related problem is that the Viterbi decoder is optimal only if the noise at its input is white. This is usually accomplished by using a whitened matched filter at the input stage of the receiver, as described in G. D. Forney, *Maximum-Likelihood Sequence Estimation of Digital Sequences in the Presence of Intersymbol Interference,* supra. However the use of a whitened matched filter often results in exceedingly long channel responses and requires a Viterbi decoder with an impracticable number of states. In application, this problem is usually circumvented by not using a whitened matched filter at the input stage of the receiver. However, this results in substantial loss of performance. The problem of the exponential growth of the complexity of the Viterbi decoder is exacerbated even more when a channel code is used, and it is desired to perform joint decoding of the channel and the code.

A primary motivation for the present invention is that, in order to keep the complexity of the Viterbi decoder within reasonable bounds, it is necessary to limit the number of its states. As a result, the Viterbi decoder often operates under "mismatched conditions," which means that it uses a simplified model of the channel that ignores the components of the channel response which result in linear and nonlinear intersymbol interference, and it ignores noise correlation. The resulting increase in the error rate is compensated through postprocessing techniques aimed at correcting a large fraction of the errors that arise from the mismatch.

SUMMARY OF THE INVENTION

Accordingly, it is an objective of the present invention to provide an efficient and cost effective method and apparatus to compensate linear or nonlinear intersymbol interference.

It is another objective to provide a method and apparatus to compensate the detrimental effects of noise correlation.

It is yet another objective to provide a method and apparatus to compensate jointly or independently the effects of linear or nonlinear intersymbol interference and noise correlation in the presence of a channel code.

The method and apparatus, in accordance with various illustrative embodiments of the present invention, are based on a concatenated decoding scheme in which an inner decoder is a low complexity Viterbi decoder that operates in the presence of linear or nonlinear intersymbol interference, correlated noise, or some combination thereof, and the outer decoder, referred to as a postprocessor, is used to introduce error correction by taking advantage of knowledge about the components of the channel response or the correlation of the noise that were ignored by the inner decoder.

The N most likely paths representing the received signal are generated by an inner decoder or a combination of an inner decoder and error event generator. These paths are then input to the postprocessor which computes metrics for each path based on information about the signal, which was not considered by the inner decoder. The path having the best metric, i.e., the least error of the N paths, is selected as the output of the concatenated decoder. The postprocessor metrics can be based on linear or nonlinear model of the channel, and by passing the input signal to the postprocessor through a noise whitening filter, the postprocessor can also compensate for noise correlation.

Alternatively, the inner decoder can output a single best path, which can then be input to the postprocessor. The postprocessor can simultaneously create alternative paths and store them with metrics based on information about the signal, which was not considered by the inner decoder. The path having the best metric is then selected as the output of the concatenated decoder.

BRIEF DESCRIPTION OF THE DRAWINGS

FIG. 10 shows a fourth illustrative embodiment of the present invention in which the concatenated decoder operates in the presence of a channel code.

DETAILED DESCRIPTION OF THE INVENTION

Figure 1:
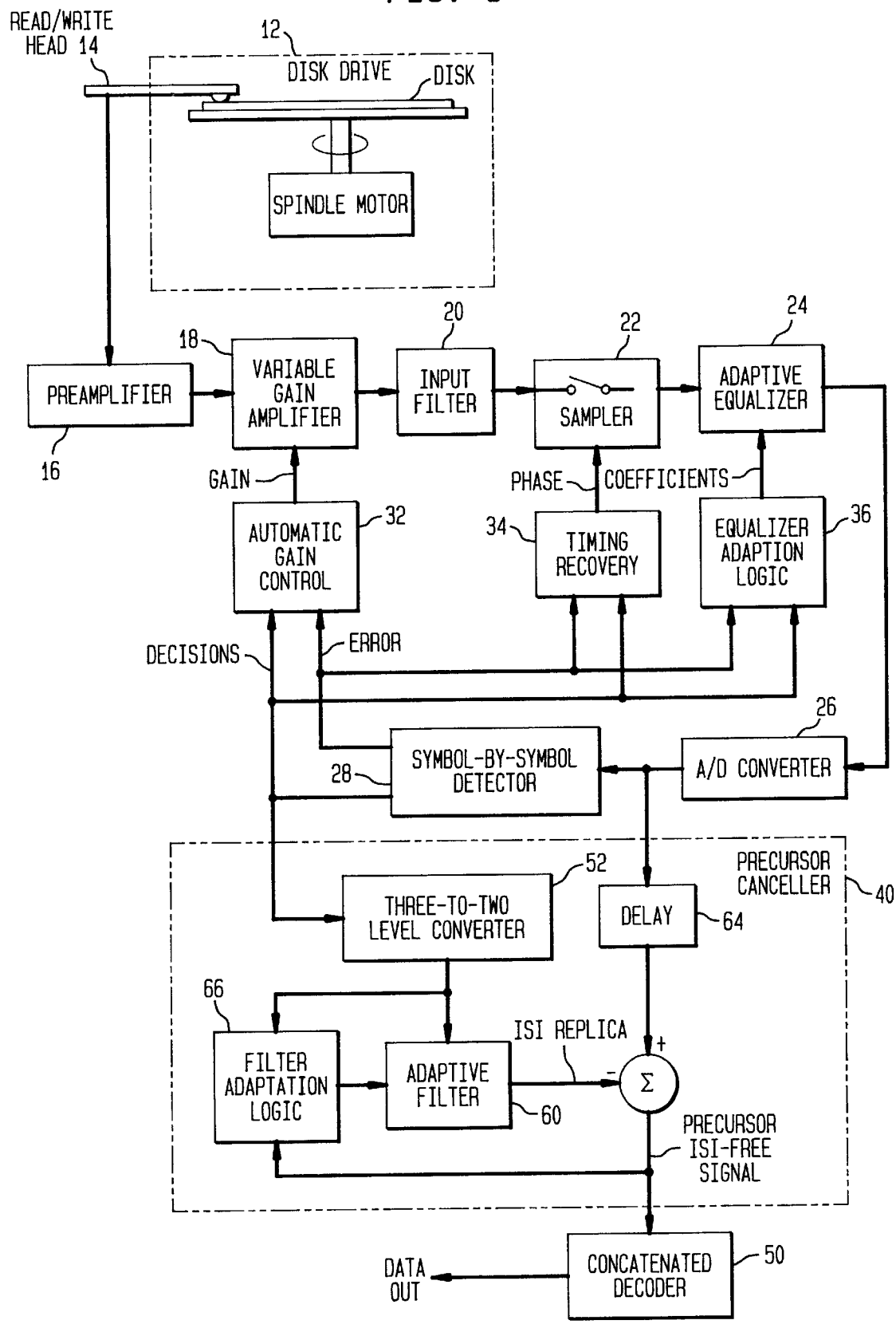
FIG. 1 shows a block diagram of a typical receiver for magnetic recording signals, which include the concatenated decoder of the present invention.

Referring to FIG. 1, a receiver is shown with the concatenated decoder of the present invention. A signal detected by magnetic head (14) is first amplified by a preamplifier (16), and then further amplified by a variable gain amplifier (18), whose gain is controlled automatically as described below. The objective of the variable gain amplifier is to keep the power level of the signal constant at the input to symbol-by-symbol detector (28) and concatenated decoder (50). The signal is subsequently filtered by an input filter (20), which removes high frequency noise and serves as an anti-aliasing filter for the sampling operation that follows as shown by block (22). This filter typically operates in continuous-time. The sampling phase is controlled by the Timing Recovery ("TR") function as shown by block (34). The rest of the receiver operates in discrete time. The adaptive equalizer (24) is an adaptive transversal filter which compensates for a large part, but not all, of the ISI. The equalizer also shapes the channel response to the appropriate target response, for example a PR IV or EPR IV response.

The output of the equalizer is converted to a digital representation by the A/D converter (26), and passed to the symbol-by-symbol detector (28). Symbol-by-symbol detector (28) assigns a symbol to the equalizer output and computes an error, representing the difference between the input level and its ideal value.

The decisions actually provided to the outside world by the read-channel device are not the ones made by the symbol-by-symbol detector, but the ones made by concatenated decoder (50), which are much more reliable. However, the additional reliability of concatenated decoder (50) is achieved at the expense of an increased delay. The purpose of symbol-by-symbol detector (28) is to provide early decisions to Automatic Gain Control ("AGC") (32), TR (34), and Equalizer Adaptation ("EA") (36). Since these blocks operate inside feedback loops, it is important to minimize the delay to prevent instabilities. Using the decisions provided by concatenated decoder (50) would introduce too much delay in these loops, and would render them unstable. Although the decisions provided by symbol-by-symbol detector (28) are less reliable than the ones provided by concatenated decoder (50), this has negligible effect on these loops, which tend to average the effect of many decisions, and are therefore not significantly affected by occasional decision errors of symbol-by-symbol detector (28).

The error computed by symbol-by-symbol detector (28) is provided to AGC (32), TR (34), and EA (36). AGC (32) adjusts the gain of Variable Gain Amplifier (18), in an attempt to keep the levels at the output of the equalizer as close as possible to their ideal levels. As mentioned above, this is particularly important in the case of magnetic recording signals, owing to the rapid variations in the signal level provided by the head when the gap between head and disk varies. TR (34) adjusts the sampling phase of sampler (22) at the input of equalizer (24) such that the signal is sampled at the optimum instant. EA (36) computes the optimal values of the coefficients of equalizer (24), attempting to minimize ISI.

AGC (32), TR (34) and EA (36) use decision directed algorithms, and therefore require as inputs both the decisions and the error provided by symbol-by-symbol detector (28). These algorithms are well known in the prior art, and are described in detail in references such as R. Cideciyan et al., *A PRML System for Digital Magnetic Recording,* 10

IEEE Journal on Selected Areas in Communications pp. 38–56 (January 1992), and J. Sonntag et al., *A High Speed, Low Power PRML Read Channel Device*, 31 IEEE Transactions on Magnetics pp. 1186–1195 (March 1995), both of which are hereby incorporated by reference as if fully set forth herein.

The output of symbol-by-symbol detector (28) also passes to precursor canceler (40) which produces a replica of the precursor ISI. Precursor canceler (40) represents the combination of elements that eliminate precursor ISI. The output of the precursor canceler is subtracted from a delayed version of the equalized signal. A more complete description of precursor ISI cancellation can be found in U.S. patent application Ser. No. 08/381,630, supra, and O. E. Agazzi and N. Seshadri, *When Can Tentative Decisions be Used to Cancel (Linear or Nonlinear) Intersymbol Interference? (With application to Magnetic Recording Channels)*, supra.

After cancellation of the precursor ISI, the signal is passed to concatenated decoder (50). Concatenated decoder (50) comprises two consecutive decoders: an inner decoder, and an outer decoder or postprocessor. The inner decoder is a standard Viterbi decoder. For all, except the first, of the illustrative embodiments of the present invention, described below, the general type Viterbi decoder described by G. D. Forney, *Maximum-Likelihood Sequence Estimation of Digital Sequences in the Presence of Intersymbol Interference*, supra, is used. For the first illustrative embodiment, a modified Viterbi decoder that releases the N best paths, as described by N. Seshadri and C. E. W. Sundberg, *Generalized Viterbi Algorithms for Error Detection with Convolutional Codes*, supra, is used.

For simplicity of implementation, the inner decoder neglects some of the components of the channel response that result in linear or nonlinear intersymbol interference. It may also neglect noise correlation. Neglecting these effects results in reduced distance for error events, and consequently larger error rate than would be possible with a perfectly matched inner decoder. However, a perfectly matched inner decoder would be too complex to implement.

To compensate for the increased error rate, the postprocessor then computes metrics that take into account the components of the channel response that produce linear or nonlinear intersymbol interference, as well as the noise correlation, neglected by the inner decoder. The postprocessor can afford to carry out this more detailed analysis because it restricts its search to a small number of alternative paths, among which there is high probability of finding the correct path.

Figure 2:
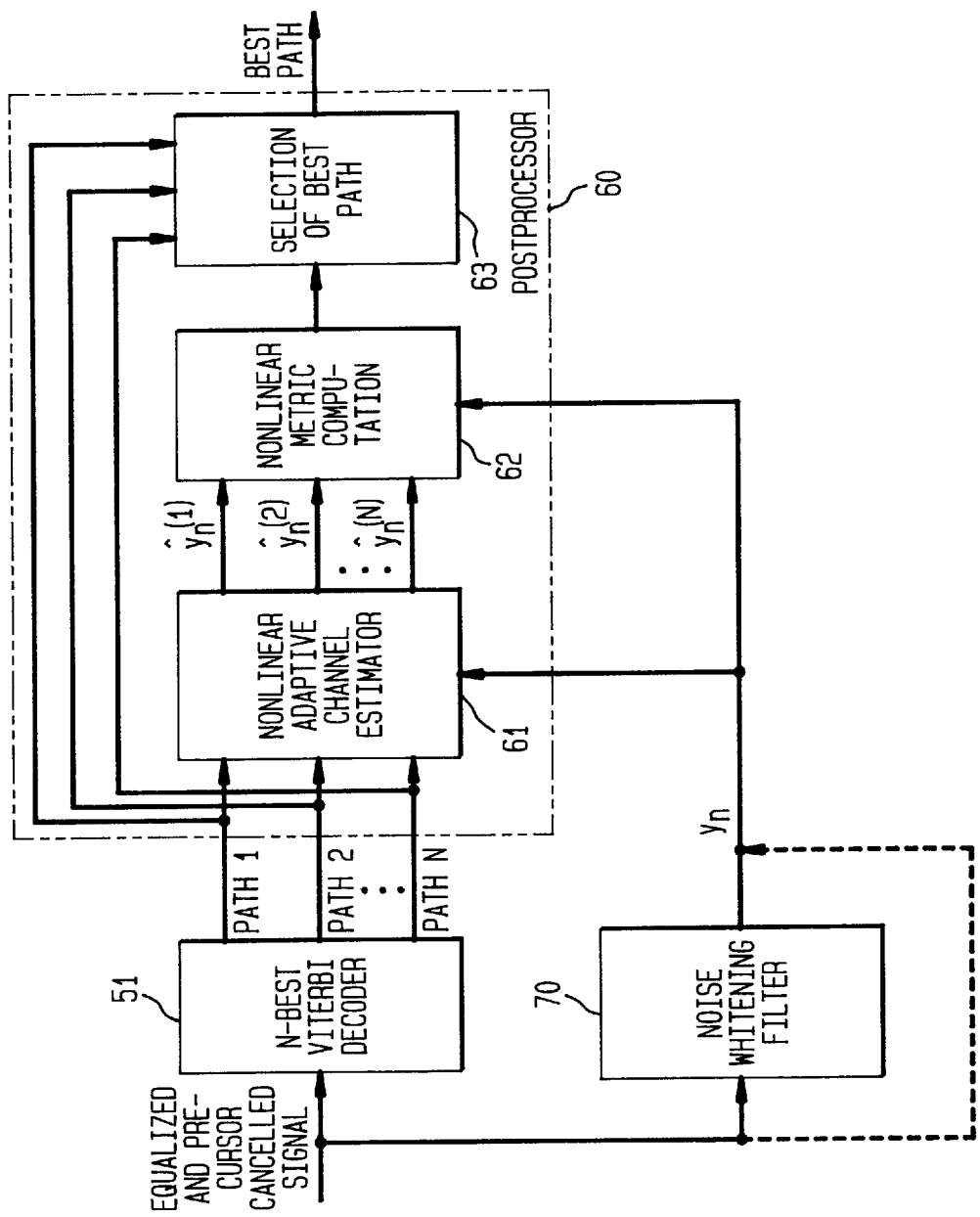
FIG. 2 shows a first illustrative embodiment of the concatenated decoder, in which the inner decoder is an N-best Viterbi decoder.

FIG. 2 shows a first illustrative embodiment of concatenated decoder (50), in which inner decoder (51) is an N-best Viterbi decoder. Inner decoder (51) releases a list of N paths ordered from most likely to less likely. The likelihoods assigned by the inner decoder to the different paths are computed based on the information available to the inner decoder. However, since inner decoder (51) neglects part of the information about the channel, as mentioned before, this ranking may be different from the one that an optimal decoder, one that makes use of all the available information, would produce. This creates the opportunity for postprocessor (60) to compute a different ranking of the same paths, based on more complete information. Choosing the top candidate in this new ranking and releasing it as the final output of concatenated decoder (50) results in a greatly reduced error rate.

Let path m consist of the sequence of bits $$(\ldots, a_{n-1}^{(m)}, a_n^{(m)}, a_{n+1}^{(m)}, \ldots) \qquad (3)$$

and let the noise-free channel response at time n to the sequence in path m be $$\hat{y}_n^{(m)} = F(a_{n+\gamma}^{(m)}, a_{n+\gamma-1}^{(m)}, \ldots a_{n-\lambda+1}^{(m)}) \qquad (4)$$

where we assume that the response at time n depends on the $\lambda$ bits appearing before and the $\gamma$ bits appearing after time n in path m. The function F() is not assumed known a priori by the decoder (51), but it is estimated by the nonlinear adaptive channel estimator (61) using nonlinear adaptive filtering techniques well known in the prior art, such as the ones described in O. E. Agazzi et al., *Nonlinear Echo Cancellation of Data Signals*, supra and N. Holte and S. Stueflotten, *A New Digital Echo Canceler for Two-Wire Subscriber Lines*, supra. One preferred realization of the channel estimator is based on the Volterra series expansion, while another preferred realization is based on the lookup table approach. Hybrid approaches using multiple lookup tables or combinations of lookup tables and Volterra series can also be used within the spirit and scope of the present invention. See O. E. Agazzi, Nonlinear Echo Canceler for Data Signals Using A Non-Redundant Distributed Lookup Table Architecture, U.S. Pat. No. 5,329,586, filed on Jul. 12, 1994, hereby incorporated by reference as if fully set forth herein, for alternative realizations.

The adaptation algorithm used to adapt the channel estimator in the preferred embodiment is the well known least mean squares (LMS) algorithm. This algorithm can be applied to any of the filter realizations described above. The LMS algorithm requires as inputs to the adaptation process the channel signal and the data sequence at the input to the channel. The latter is not directly available, but any of the paths released by the inner decoder are estimates of the channel input data sequence that can be used in the adaptation process. The occasional errors contained in these paths are inconsequential for the adaptation process.

Channel estimator (61) applies function F() to each of the N paths produced by inner decoder (51), and computes the estimates of the noise-free channel responses for these paths, $\hat{y}_n^{(m)}$. These estimates are passed to Nonlinear Metric Computation block (62), which computes nonlinear metrics for the N paths according to the equation $$J_n^{(m)} = \sum_{k=0}^{n} (y_n - \hat{y}_n^{(m)})^2 \qquad (5)$$

Typically, the second through Nth paths only differ from the first path in certain segments of data, and will be equal the rest of the time. The segments of data where a certain path differs from the first path are called "error events". Unless the SNR is extremely low, which is unlikely in practical applications, error events will occur rather sporadically, and most of the time all N paths will have the same data. Therefore, most of the time there will be no need to make a decision. When potential error events do occur, it is necessary to wait until the error events end, at which point, the metrics for all paths are compared. The path with the lowest metric value is selected and released. At the same time all the metrics are reset to zero. Because the correct metric is based on equation (5), it may happen that the lowest metric path, as determed by block (62) of FIG. 2, is different from the lowest metric path of the inner decoder (51). Thus, this procedure results in correction of the errors that existed in the first path produced by the inner decoder, when such errors were the result of the interference not properly accounted for.

In order to avoid accumulation of large metric values which could result in overflows, it is convenient to subtract from all the metrics the smallest one. This can be done every time step n, or every certain convenient number of time steps. This procedure is called "metric normalization". If metrics are normalized, they will be nonzero only in the presence of an error event.

It is important to observe that, although channel estimator (61) is depicted as nonlinear, and therefore the metrics computed by postprocessor (60) are also nonlinear, postprocessing can improve performance even if the signal is purely linear, if there are linear components of the channel response not modeled by the inner decoder.

As shown in FIG. 2, the detrimental effects of noise correlation can be compensated by introducing noise whitening filter (70) in the signal path before it is fed to nonlinear channel estimator (61) and nonlinear metric computation block (62). This filter can be implemented as a finite impulse response (FIR) filter, and its coefficients computed using linear prediction techniques well known in the art. One exemplary technique is the Maximum Entropy Method, described more fully in T. M. Cover and J. A. Thomas, *Elements of Information Theory* (1991 and W. H. Press et al., *Numerical Recipes in C* §13.6 (2d ed. 1992), both of which are hereby incorporated by reference as if fully set forth herein. For implementation reasons it may be preferable to use a simple filter that whitens the noise only approximately. For example, a filter with response (1+D), where D is the delay operator, may suffice.

A possible variation of the illustrative embodiment of FIG. 2 consists in feeding postprocessor (60) only those paths whose metrics differ from the metric of the first path by an amount less than a certain threshold, rather than all the N paths produced by inner decoder (51). This approach has the virtue of reducing computation, by removing from consideration some extremely unlikely paths. If all of the paths from 2 through N differ in metric by more than the threshold, postprocessor (60) does not need to be activated.

Figure 3:
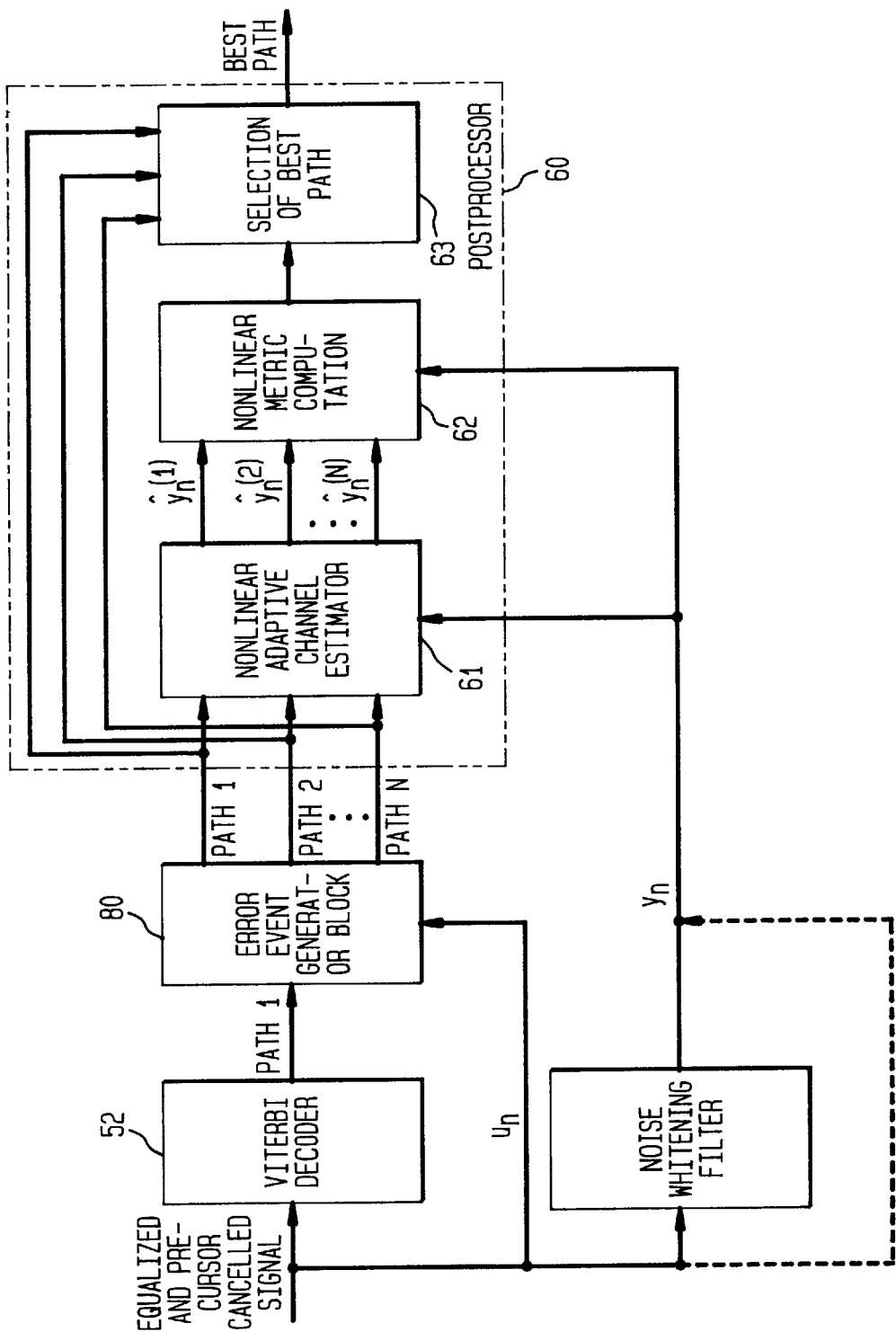
FIG. 3 shows a second illustrative embodiment of the concatenated decoder, in which the inner decoder is a regular Viterbi decoder that releases only one path.

FIG. 3 shows a second illustrative embodiment of concatenated decoder (50), in which inner decoder (52) is a Viterbi decoder that releases only one path. As in the first illustrative embodiment, it operates in the presence of interference and correlated noise. The only difference between this embodiment and the first is that the list of alternative paths passed to the postprocessor is created by Error Event Generator (80). Error Event Generator (80) creates alternative paths by adding the most likely error events to the most likely path, the first path, selected by Viterbi decoder (52). The list of alternative paths created by Error Event Generator (80) is passed to postprocessor (60), which computes metrics that make use of a model of the channel including the nonlinearity. The path with the best nonlinear metric is selected and released. The signal used by postprocessor (60) can be prefiltered by a noise whitening filter, as in the first illustrative embodiment.

Given a specific channel and the data in the first path, Error Even Generator can identify a list of the most likely error events. The procedure used to create the list of most likely error events is best explained assuming a specific channel. For purpose of illustration, assume that the channel (as shaped by Equalizer (24)) has a PR IV response and the decoder (52) is matched to the ideal PR IV channel. Of course, the fact that there are components of the channel response that cannot be properly modeled by inner decoder (52) implies that the channel is only approximately a PR IV channel. It will be clear to anyone skilled in the art that similar concepts can be applied to channels with responses other than PR IV.

Figure 4A:
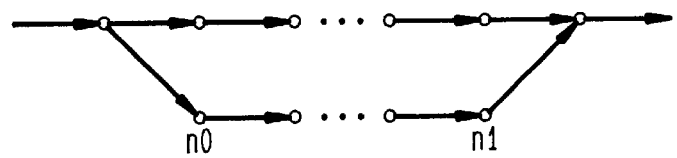
FIG. 4a shows the form of a typical minimum-distance error event in each interleave of a PR IV channel.
Figure 4B:
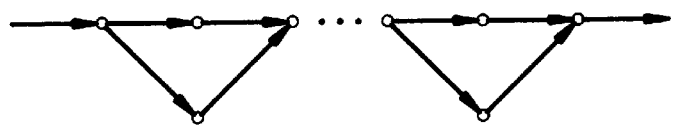
FIG. 4b shows second-order error events in an ideal PR IV channel.

As is well known in the art and more fully described in R. Cideciyan et al., *A PRML System for Digital Magnetic Recording,* supra, a PR IV channel is described by the response $(1-D)^2$, and it can be decomposed for the purpose of analysis into two interleaved channels with response $(1-D)$. FIG. 4a shows the form of a typical minimum-distance, $d^2=8$, error event in each interleave of a PR IV channel. The error event begins at time $n_0$ when a sequence of 1s or 0s are recognized as a sequence of 0s or 1s, respectively, until time $n_1$. Since in the presence of nonlinearity the distances of error events could be different from their ideal values, "first-order error events" refer to those events that would have minimum distance under ideal PR IV response. Similarly, "second-order error events" refer to the ones that would have $d^2=16$ in an ideal PR IV channel, as shown in FIG. 4b, and so on.

Figure 4C:
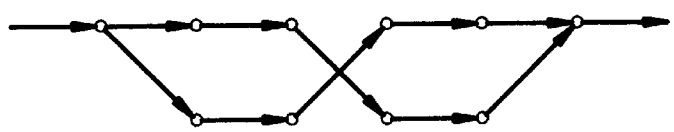
FIG. 4c shows higher-order error events, resulting in crossings.

The maximum number of different paths that may need to be presented to the postprocessor depends on the maximum length of the error events. The latter is often limited by a code. For example, the rate 8/9 code described in R. Cideciyan et al., *A PRML System for Digital Magnetic Recording,* supra, can limit the event length to a small number such as 4 or 5 in each interleaved (1–D) channel. The DC-free code of K. Knudson et al., *A Concatenated Decoding Scheme for* (1–D) *Partial Response with Matched Spectral Null Coding,* supra, also limits the length of error events to the block size. Since "crossings," shown in FIG. 4c, as when a sequence of bits change from 0 to 1 or vice verse, the error path switches accordingly and continues to incorrectly identify the received bits, result in a $d^2 \geq 24$ error event, the following "no crossing" conditions are valid for first-order events:

$$a_{n_0}^{(1)} = a_{n_0+1}^{(1)} = \ldots = a_{n_1}^{(1)} \tag{6}$$

$$a_{n_0}^{(m)} = a_{n_0+1}^{(m)} = \ldots = a_{n_1}^{(m)} \tag{7}$$

The error event is assumed to start at time no and end at time $n_1$, $\{a_n^{(1)}\}$ denotes the data for the path released by the Viterbi decoder, and $\{a_n^{(m)}\}$ is the data for the path associated with the error event m>1.

The list of error events compatible with the data of the first path can be very long. The list may be pruned, however, by making use of the additional information provided by the equalized and precursor-canceled signal $r_n$. This can be done by computing the metrics for the error events under the simplifying assumption that the channel is an ideal PR IV channel, and deleting all those events whose metric exceeds a certain threshold T.

The ideal PR IV metric for the path chosen by the Viterbi decoder is $$J^{(1)} = \sum_{k=n_0}^{n_1+2} [r_k(d_k^{(1)} - a_{k-2}^{(1)}) + d_k^{(1)} a_{k-2}^{(1)}] \tag{8}$$

whereas the error-event path metric $J^{(m)}$ has a similar expression in terms of $a_k^{(m)}$. It follows from equations (1) and (2), that the error event metric $\Delta J = J^{(m)} - J^{(1)}$ is $$\Delta J = a_{n_0}^{(1)}(r_{n_0} - r_{n_1+2} + a_{n_0-2}^{(1)} + a_{n_1+2}^{(1)}) \tag{9}$$

Where one is interested only in the magnitude of the error event metric, the above expression can be simplified to $$|\Delta J| = |r_{n_0} - r_{n_1+2} + a_{n_0-2}^{(1)} + a_{n_1+2}^{(1)}| \tag{10}$$

The Error Event Detector of FIG. 3 uses two conditions to detect a potential minimum-distance error event of length l. The first condition is equation (6), and the second is $$|\Delta J| \leq T \tag{11}$$

where T is a threshold that one skilled in the art could readily adjust by trial and error.

Figure 5:
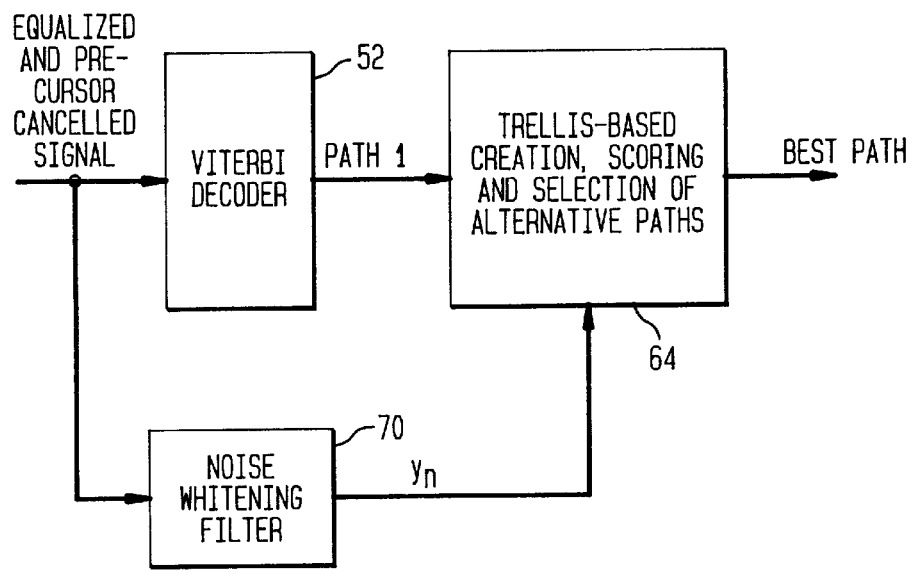
FIG. 5 shows a third illustrative embodiment of the present invention in which the postprocessor operates by searching a trellis whose states indicate the length of the error events.

FIG. 5 shows a third illustrative embodiment of the invention. In this embodiment, block (64), labeled "Trellis-based creation, scoring, and selection of alternative paths" examines the single path output of inner decoder (52), and simultaneously creates and scores, based on nonlinear and optionally noise-whitened metrics, alternative paths exploiting a trellis representation of error events. The key concept in this representation is a trellis diagram where each state represents the number of bits in error that remain in the path under consideration before it reemerges with the output of inner decoder (52), referred to as the "main path" in the following discussion. The present definition of states is different from the one traditionally used in Viterbi decoders. While the number of states of an optimal Viterbi decoder, one that is perfectly matched to the channel, grows exponentially with the length of the channel impulse response, or the length of the Volterra kernels if the channel is nonlinear, the number of states of the trellis-based postprocessor is determined by the maximum length of error events that can be generated by inner decoder (52), and it is independent of the length of the channel response. Thus this embodiment of the postprocessor is most efficient in those situations where it is desired to decode a long channel response, which might arise, as a result of noise decorrelation, and the length of error events is limited.

It is convenient to introduce the trellis in the context of a channel equalized to a PR IV response, where inner decoder (52) is matched to the ideal PR IV response, but where mismatches arise from linear or nonlinear intersymbol interference, or noise correlation. The trellis approach can be generalized to an EPR IV channel, as well as other channels.

Figure 6:
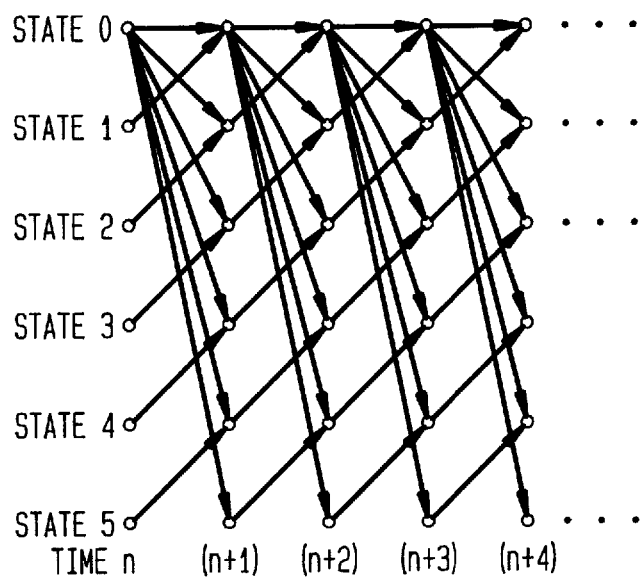
FIG. 6 is a trellis description of error events for a 1–D channel.

FIG. 6 illustrates the trellis for the case of a (1−D) channel. The PR IV channel can be analyzed in terms of its two interleaved (1−D) channels. State 0 and its associated path correspond to the output of inner decoder (52). State 1 corresponds to a length 1 error event, state 2 corresponds to a length 2 error event, and so on. Clearly, the number of states in the trellis is equal to one plus the maximum length of an error event. As stated above, the maximum length of an error event is usually limited by a code. The beginning of an error event of length S is represented in a trellis diagram by a transition from state 0 to state s. Since the state number represents the number of bits in error between and including the state under consideration, at the time instant under consideration and the end of the error event, it is clear that from any state s>0, it is only possible to make transitions to state s−1. However, assuming that all error events from length 0 to S are allowed, it is possible in principle to make transitions from state 0 to any other state. In fact, many of these transitions are not possible because the data sequence for the main path is such that the corresponding error event would have a distance larger than minimum. Transitions from state 0 are referred to as "irregular transitions", and transitions from any other state s>0 to state s−1 are referred to as "regular transitions".

Metrics for all the paths can be computed using two assumptions. First, at any given time, the future part of the path passing through a given state is known. Second, for interleaved (1−D) channels, metrics for a given state and a given interleave can be computed assuming path 0 for the other interleave. The first assumption is true because the transitions from state s>0 are deterministic. Although the transitions from state 0 are not deterministic when evaluating metrics for a certain path corresponding to an error event, irregular transitions occurring at future times can be neglected. This is equivalent to neglecting non-minimum distance error events, which is reasonable. The second assumption is equivalent to neglecting simultaneous error events in both interleaves. This is reasonable at moderate to high SNRs.

Figure 7:
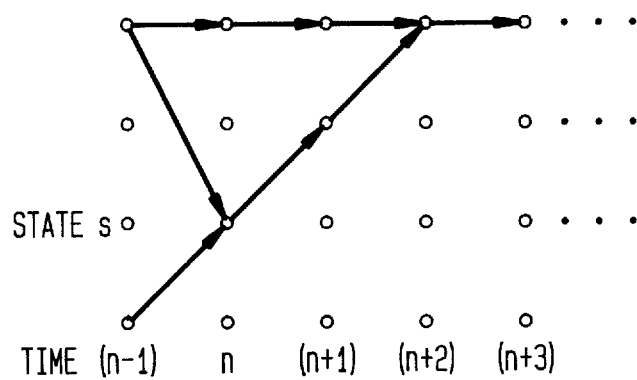
FIG. 7 illustrates the use of a lookahead window in computing the metrics for the trellis-based postprocessor.

Metric computations must be done with a "lookahead window" of W=M−1 bits, where M is the duration of the channel response. FIG. 7 illustrates this concept. By delaying the signal appropriately, it is always possible to assume that the channel response is entirely causal, i.e. it has no precursors. Unlike a traditional Viterbi algorithm, the decision about survivor paths at a state s at time n cannot be made solely on the basis of the path metric up to and including time n for the paths converging to state s. In the traditional Viterbi computation, all the channel memory necessary to compute the above metrics is given by the transitions (state at time n−1 and state at time n for the given path). In the present case, the path emanating from a certain state is uniquely defined under the above two assumptions, but the use of future bits in the metric computation is necessary before a decision can be made about the survivor path at state s and time n. This is the "lookahead window" W.

The need to compute metrics over this lookahead window does not increase the amount of computation required for regular branches, but it does increase it somewhat for irregular branches, since W branch metrics need to be computed at once for each irregular extension. Therefore the peak number of branch metric computations per baud period is $S+(S-1)W=(S*M)-M+1$, where S is the number of states. In a traditional Viterbi algorithm the number of branch metric computations would be 25, assuming that two paths converge to each state as happens when the data symbols are binary. However the average number of computations is typically much smaller because not all irregular extensions are always possible or likely. To avoid unnecessary computations, irregular extensions are made only when the conditions for candidate error events discussed in connection with the second illustrative embodiment are satisfied. The verification that these conditions are met is done "on the fly," at the time when an irregular extension is created. If the conditions are not met, the associated irregular extension is not created. Therefore, in the trellis based postprocessor of this third illustrative embodiment, block (30) used in the second illustrative embodiment to generate alternative paths becomes an integral part of postprocessor (64).

Figure 8:
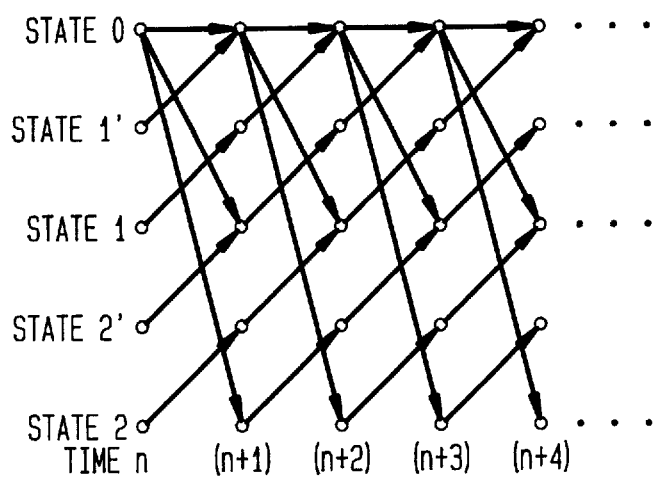
FIG. 8 shows a modified trellis diagram of the two interleaves of a PR IV channel.

FIG. 8 shows a modified trellis diagram of the two interleaved (1−D) channels of PR IV. Dummy states, labeled 1', 2', etc., are introduced as a convenient way to represent both interleaves in one diagram. These dummy states do not cost any additional computation.

Figure 9:
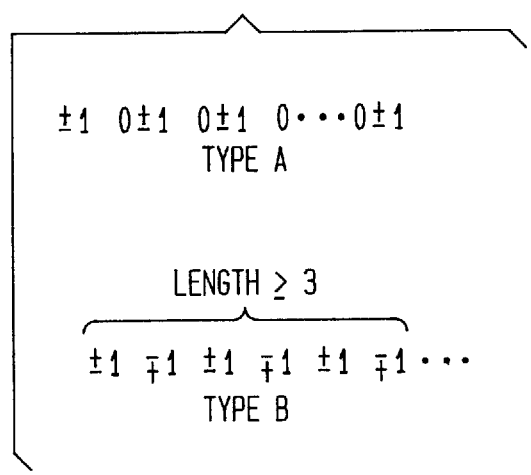
FIG. 9 shows the general form of first-order error events for an EPR IV channel.

FIG. 9 shows the general form of first-order error events for an EPR IV channel. Type A error events are similar to first-order error events for a PR IV channel, while type B events are different. Both types of error events can be represented by trellises of the kind shown in FIG. 8. However, since states associated with type B events are different from states associated with type A events, so representing both types of events requires an increased number of states.

The type A events occur in one interleave at a time. Thus where every other bit is in error, the combination of the two interleaves will alternate, between canceling each other and doubling their respective value. Type B events occur in both interleaves. FIG. 9, depicts the case where the main path comprises a sequence of alternating bits. In EPR IV, minimum distance error events can occur in both interleaves.

However, in PR IV, minimum distance error events can only occur in one interleave at a time.

Although the trellis-based postprocessor has been described in the specific context of a PR IV or an EPR IV inner decoder, the same concept can be applied to other channels without departing from the spirit and the scope of the present invention. There are two general advantages to the trellis-based postprocessor. One, effective use of the dynamic programming principle, which allows paths with cost higher than the best to be deleted as soon as enough information is available, with no sacrifice in performance. This minimizes the computation and storage requirements. Two, recursive computation of the metrics, which allows the computational load to be essentially constant as a function of time, as opposed to a more "bursty" computation when metrics are computed in a nonrecursive way.

FIG. 10 shows a fourth illustrative embodiment of the invention, in which concatenated decoder (50) operates in the presence of a channel code such as matched-spectral null ("MSN") codes. Inner decoder (52) ignores certain components of the channel response, the noise correlation, and the code constraints and releases only one output path. Block (56), labeled "Detection of code constraint violations and creation of alternative paths, identifies blocks with nonzero charge imbalance, and creates alternative paths such that all of them satisfy the code constraints, and differ from the input path in a minimum distance error event". Postprocessor (60) is activated when at least one block with nonzero charge imbalance is detected, and scores the alternative paths based on nonlinear, and optionally, noise-whitened metrics.

One MSN code is described in K. Knudson et al., *A Concatenated Decoding Scheme for* (1–D) *Partial Response with Matched Spectral Null Coding*, supra. For this code, data are grouped in blocks of k bits for each interleaved (1–D) channel, and coded into n bits, with the constraint that each block be DC balanced, i.e., that the number of 0's be equal to the number of 1's. The number of codewords of block size n is $$m = \binom{n}{n/2},$$

and k must satisfy the condition $2^k \leq m$.

It can be shown that any minimum distance error event will cause the code constraint to be violated by introducing a charge disparity, i.e., an unequal number of 1's and 0's in the block. Therefore, minimum distance error events can be detected by identifying blocks with a nonzero charge disparity. The code constraints also make it possible to derive the length and the possible locations of the error events. This reduces the number of possibilities that need to be checked and simplifies decoding.

Figure 11A:
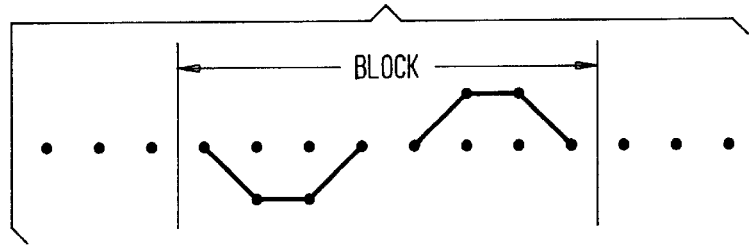
FIG. 11 illustrates the second-ordered error events which may exist after postprocessing.
Figure 11B:
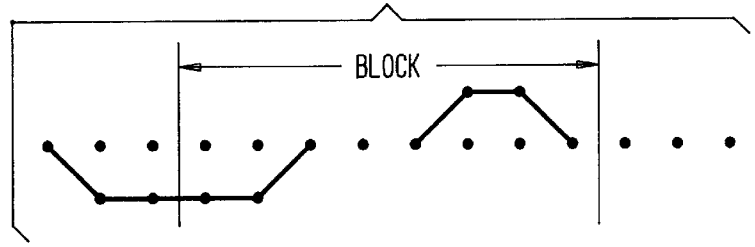
Figure 11C:
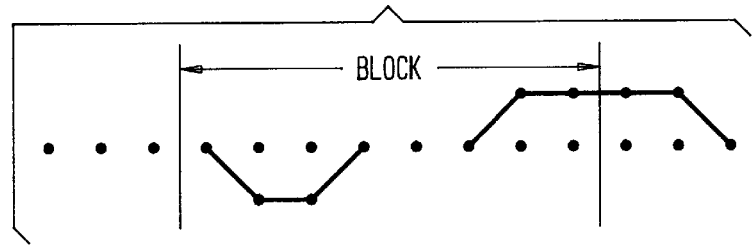

After error correction, all blocks must be DC balanced. Therefore, only second-order error events as illustrated in FIG. 11, or events of higher order, whose distance is larger than the distance of second-order events, but with perfect charge balance, are possible error events after postprocessing. Since error correction is accomplished by choosing the path with the best metric among all those paths that produce a DC-balanced block, the algorithm based on linear metrics, instead of correcting the first-order event, occasionally introduces an event of the type shown in FIG. 11. The algorithm based on nonlinear metrics, however, correctly identifies the first-order error event and corrects it. Accordingly, using MSN coding together with the present invention provides gains over the linear case.

Figure 12:
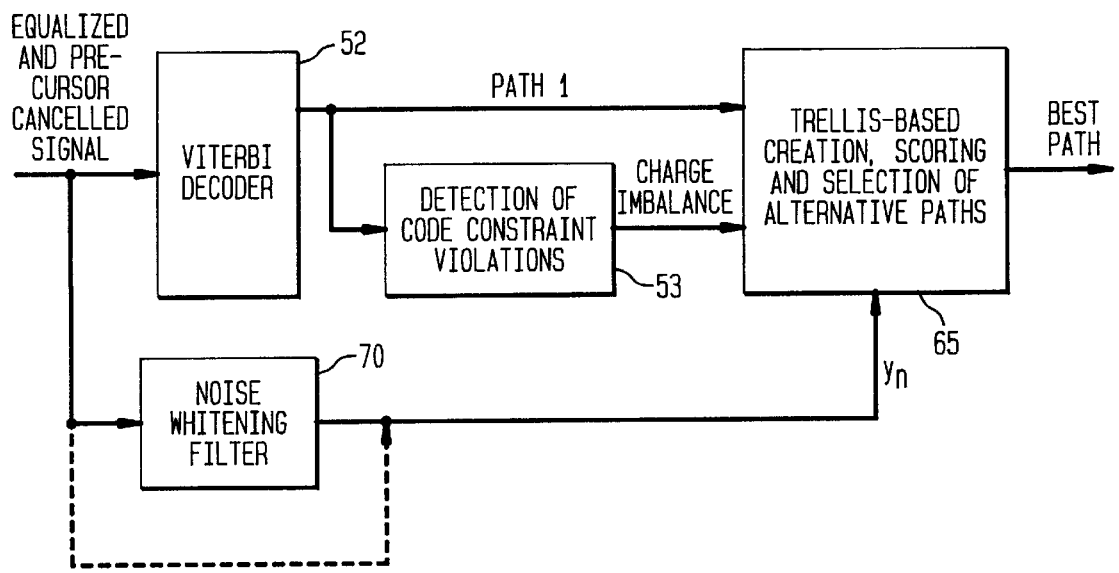
FIG. 12 shows a fifth illustrative embodiment of the invention, in which the concatenated decoder operates in the presence of a channel code, and the postprocessor operates by searching a trellis.
Figure 13:
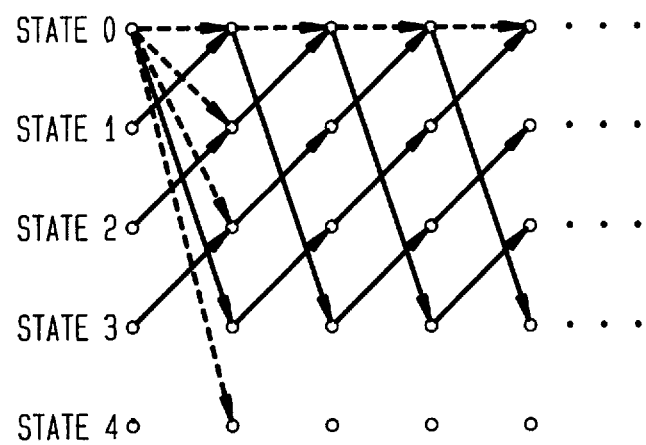
FIG. 13 illustrates the drastic reduction in the number of paths that have to be searched when implementing the fifth embodiment of the present invention.

FIG. 12 shows a fifth illustrative embodiment of the invention, where concatenated decoder (50) operates in the presence of a channel code, and the creation, scoring, and selection of alternative paths is done according to a trellis-based algorithm similar to that described for the third illustrative embodiment. Inner decoder (52) releases only one path, and ignores the code constraints. The charge imbalance in the output of inner decoder (52) is computed by block (53), labeled "Detection of Code Constraint Violations". The value of this imbalance is passed to postprocessor (65), labeled "Trellis-based creation, scoring, and selection of alternative paths," which simultaneously creates a list of alternative paths and scores them using nonlinear, and optionally, noise-whitened metrics. Post processor (65) uses the charge imbalance information to carry out a constrained search where only the paths that correspond to error events with a charge imbalance equal to the one found in the output of inner decoder (52) are searched. If there are no code constraint violations in the output of inner decoder (52), postprocessor (65) does not need to be activated. Because of the drastic reduction in the number of paths that have to be searched, the use of a DC-free code results in an important simplification of the trellis based postprocessor, as illustrated in FIG. 13.

The foregoing merely illustrates the principles of the present invention. Those skilled in the art will be able to devise various modifications, which although not explicitly described, or shown herein, embody the principles of the invention and are thus within its spirit and scope.

What is claimed is:

1. A method for decoding a received digital signal transmitted over a channel, said method comprising:
    generating N most likely paths representing said received digital signal, each of said N most likely paths having a first type metric associated therewith, said first type metric based on a simplified model of said channel; and
    postprocessing said N most likely paths for a final most likely path representative of said received digital signal, said most likely path indicated by a best second type metric, said best second type metric based on a comprehensive model of said channel which accounts for at least one source of channel information from a group consisting of intersymbol interference and nonlinearity.

2. A method according to claim 1 wherein said channel is a magnetic recording channel.

3. A method according to claim 1 wherein said generating step further comprises the steps of:
    generating a single tentative most likely path representative of said received digital signal;
    computing a finite number of most likely error events based on said simplified model of said channel; and
    generating said N most likely paths by combining said tentative most likely path with said finite number of most likely error events using a trellis style implementation.

4. A method according to claim 3 wherein said most likely error events are based on said first type metric.

5. A method according to claim 1 wherein said simplified model of said channel does not consider a nonlinear component of said channel.

6. A method according to claim 1 wherein said simplified model of said channel does not consider a noise correlation component of said channel.

7. A method according to claim 5 wherein said nonlinearity of said comprehensive model is based on a Volterra series expansion.

8. A method according to claim 5 wherein said nonlinearity of said comprehensive model is based on a lookup table.

9. A method according to claim 1 wherein said generating step is implemented with an N-best Viterbi decoder.

10. A method according to claim 1 wherein said N most likely paths are constrained to paths having a first type metric value less than a predetermined threshold.

11. A method according to claim 1 wherein said comprehensive model of said channel further accounts for the effect of correlation of noise in said channel.

12. A method according to claim 1 wherein said received digital signal was transmitted with a channel code and said generating N most likely paths ignores said channel code.

13. A method according to claim 3 wherein said received digital signal was transmitted with a channel code, said generating a single tentative most likely path step ignores said channel code and said most likely error events are based on said channel code.

14. A method according to claim 1 wherein said received digital signal is divisible into one or more blocks of data, each of said blocks being constrained under a channel code, further comprising the steps of:
    determining whether any of said blocks of said N most likely path, violates said channel code;
    eliminating said paths of said N most likely paths having a channel code violation, said paths of said N most likely paths not eliminated, comprising a set of N' most likely paths; and
    activating said postprocessing step if said set of N' most likely paths comprises more than one most likely path.

15. A method according to claim 11 wherein said postprocessing step includes the use of a noise-whitening filter.

16. A concatenated decoder for decoding a received digital signal transmitted over a channel comprising:
    an inner N-best Viterbi decoder; and
    a postprocessor comprising computer implemented means for computing a metric based on a comprehensive model of said channel, said comprehensive model accounting for at least one source of channel information from a group consisting of intersymbol interference and nonlinearity; and
    computer implemented means for selecting a most likely path representative of said received digital signal, based on said metric, wherein said postprocessor further comprises means for adaptive channel estimation of characteristics of said channel.

17. A concatenated decoder according to claim 16 wherein said means for estimating channel characteristics of said channel includes means for estimating nonlinear components of said channel.

18. A concatenated decoder for decoding a received digital signal transmitted over a channel, comprising:
    an inner decoder for generating N most likely paths representing said received digital signal, each of said N most likely paths having a first type metric associated therewith, said first type metric based on a simplified model of said channel; and
    a postprocessor for determining a final most likely path from said N most likely paths representative of said received digital signal, said most likely path indicated by a best second type metric, said second type metric based on a comprehensive model of said channel which accounts for at least one source of channel information from the group consisting of intersymbol interference and nonlinearity.

19. A concatenated decoder according to claim 18 wherein said inner decoder further comprises:
    a decoder having a single tentative most likely path output;
    means for computing a finite number of most likely error events based on a simplified model of said channel; and
    means for generating said N most likely paths by combining said single most likely path decoder output with said finite number of most likely error events using a trellis style implementation.

20. A concatenated decoder according to claim 18, wherein said received digital signal is divisible into one or more blocks of data, and each of said blocks being constrained under a channel code, further comprising:
    means for determining whether any of said N most likely paths, violates said channel code;
    means for eliminating said paths of said N most likely paths having a channel code violation, said paths of said N most likely paths not eliminated, comprising a set of N' most likely paths; and
    means for activating said postprocessing step if said set of N' most likely paths comprises more than one most likely path.

21. A method for decoding a received digital signal transmitted over a channel, said method comprising:
    generating a single tentative most likely path representative of said received digital signal based on a simplified model of said channel;
    computing a finite number of most likely error events based on said simplified model of said channel using a trellis implementation;
    generating N most likely paths by combining said single tentative most likely path with said finite number of most likely error events using said trellis style implementation;
    computing a second type metric based on a comprehensive model of said channel; and
    generating a single most likely path based on said second type metric using said trellis style implementation.

22. A method according to claim 21 wherein said trellis style implementation involves one or more states, each of said states representing a different length of error event.

23. A method according to claim 22 wherein said error event comprises one or more error event types and each of said error event types are represented by a different state.

24. A method according to claim 22 wherein said channel has a PR IV response and said error events are first order error events.

25. A method according to claim 23 wherein said channel has an EPR IV response and said error events are first order error events.

26. A method according to claim 21 wherein said comprehensive model accounts for at least one source of channel information from the group consisting of intersymbol interference, nonlinearity and noise correlation.

* * * * *